US011898949B2

(12) United States Patent
Ohuchi et al.

(10) Patent No.: US 11,898,949 B2
(45) Date of Patent: Feb. 13, 2024

(54) FINE BUBBLE ELIMINATION METHOD AND FINE BUBBLE ELIMINATION DEVICE, AND BUBBLE SIZE DISTRIBUTION MEASURING METHOD AND BUBBLE SIZE DISTRIBUTION MEASURING DEVICE

(71) Applicants: Shimadzu Corporation, Kyoto (JP); National Institute of Technology and Evaluation, Tokyo (JP); Fine Bubble Industries Association, Tokyo (JP)

(72) Inventors: Seika Ohuchi, Tokyo (JP); Mitsuru Tanaka, Tokyo (JP); Haruo Shimaoka, Kyoto (JP)

(73) Assignees: Shimadzu Corporation, Kyoto (JP); National Institute of Technology and Evaluation, Tokyo (JP); Fine Bubble Industries Association, Tokyo (JP)

( * ) Notice: Subject to any disclaimer, the term of this patent is extended or adjusted under 35 U.S.C. 154(b) by 46 days.

(21) Appl. No.: 16/769,239

(22) PCT Filed: Nov. 29, 2018

(86) PCT No.: PCT/JP2018/044036
§ 371 (c)(1),
(2) Date: Jun. 2, 2020

(87) PCT Pub. No.: WO2019/111802
PCT Pub. Date: Jun. 13, 2019

(65) Prior Publication Data
US 2020/0340898 A1 Oct. 29, 2020

(30) Foreign Application Priority Data
Dec. 4, 2017 (JP) .................................. 2017-232368

(51) Int. Cl.
*G01N 15/02* (2006.01)
*G01N 15/00* (2006.01)

(52) U.S. Cl.
CPC .. *G01N 15/0205* (2013.01); *G01N 2015/0011* (2013.01); *G01N 2015/0283* (2013.01)

(58) Field of Classification Search
CPC .......... G01N 15/0205; G01N 15/0211; G01N 15/1404; G01N 15/14; G01N 2015/0011; (Continued)

(56) References Cited

U.S. PATENT DOCUMENTS 3,904,392 A * 9/1975 VanIngen ........... B01D 19/0078
366/113
4,889,603 A * 12/1989 DiSanto ................ G02F 1/1679
430/34
(Continued)

FOREIGN PATENT DOCUMENTS

CN 101872130 10/2010
CN 102899724 A * 1/2013
(Continued)

OTHER PUBLICATIONS

"International Search Report (Form PCT/ISA/210) of PCT/JP2018/044036," dated Mar. 5, 2019, with English translation thereof, pp. 1-4.
(Continued)

*Primary Examiner* — Hoa Q Pham
(74) *Attorney, Agent, or Firm* — JCIPRNET

(57) ABSTRACT

By irradiating target liquid L containing fine bubbles with ultrasonic waves from an ultrasonic irradiation device 102, the fine bubbles in the target liquid L is reduced. By irradiating the target liquid L with ultrasonic waves, fine bubbles in the target liquid L can be reduced effectively. By using ultrasonic waves, bubbles with small diameters, par- (Continued)

ticularly fine bubbles, can be effectively reduced, so that fine bubbles in the target liquid L can be efficiently reduced.

8 Claims, 6 Drawing Sheets

(58) Field of Classification Search
CPC ... G01N 2015/0283; G01N 2015/0294; G01N 2015/1486; G01N 21/51; G01N 21/47; G01N 2021/4707; G01N 2021/054; G01N 2021/4726; G01N 2291/02433; G01N 2291/036
USPC .......... 356/335–343; 73/19.03, 53.01, 19.1, 73/61.75, 61.71, 19.01; 250/573–575
See application file for complete search history.

(56) References Cited

U.S. PATENT DOCUMENTS

| | | | |
|---|---|---|---|
| 5,834,625 | A | 11/1998 | Kraus, Jr. et al. |
| 6,629,449 | B1 * | 10/2003 | Kline-Schoder ..... A61B 8/4209 73/19.1 |
| 6,643,021 | B1 * | 11/2003 | Kawamura ............ G01N 21/15 356/436 |
| 7,014,966 | B2 * | 3/2006 | Pawloski ............ G03F 7/70341 430/30 |
| 2005/0078286 | A1 | 4/2005 | Dierichs et al. |
| 2012/0209116 | A1 | 8/2012 | Hossack et al. |
| 2014/0096599 | A1 * | 4/2014 | Munch .................. G01H 5/00 73/61.79 |
| 2017/0176305 | A1 | 6/2017 | Shi et al. |
| 2017/0341038 | A1 | 11/2017 | Fox et al. |

FOREIGN PATENT DOCUMENTS

| | | | |
|---|---|---|---|
| EP | 1489461 | | 12/2004 |
| JP | S5528706 | | 2/1980 |
| JP | H05137904 | A * | 6/1993 |
| JP | H05317606 | A * | 12/1993 |
| JP | H0615757 | U * | 3/1994 |
| JP | H0716402 | A * | 1/1995 |
| JP | H0871304 | | 3/1996 |
| JP | H1085509 | | 4/1998 |
| JP | 2003088784 | A * | 3/2003 |
| JP | 2006223239 | | 8/2006 |
| JP | 2007263876 | | 10/2007 |
| JP | 2007326088 | A * | 12/2007 |
| JP | 2011131117 | | 7/2011 |
| JP | 2011188924 | | 9/2011 |
| JP | 2013500067 | | 1/2013 |
| JP | 2014172772 | | 9/2014 |
| JP | 2014198327 | | 10/2014 |
| JP | 2016048183 | | 4/2016 |
| JP | 2016159291 | | 9/2016 |
| JP | 2017045808 | | 3/2017 |
| JP | 2017522860 | | 8/2017 |
| JP | 2017535425 | | 11/2017 |
| WO | WO 2017104194 | A1 * | 6/2017 |

OTHER PUBLICATIONS

"Written Opinion of the International Searching Authority (Form PCT/ISA/237) of PCT/JP2018/044036," dated Mar. 5, 2019, with English translation thereof, pp. 1-10.

"Office Action of Japan Counterpart Application", dated May 11, 2021, with English translation thereof, p. 1-p. 10.

"Office Action of China Counterpart Application", dated Jun. 2, 2021, with English translation thereof, pp. 1-14.

"Office Action of China Counterpart Application" with English translation thereof, dated Feb. 21, 2022, p. 1-p. 14.

"Office Action of China Counterpart Application", dated Jun. 6, 2022, with English translation thereof, p. 1-p. 13.

* cited by examiner

FINE BUBBLE ELIMINATION METHOD AND FINE BUBBLE ELIMINATION DEVICE, AND BUBBLE SIZE DISTRIBUTION MEASURING METHOD AND BUBBLE SIZE DISTRIBUTION MEASURING DEVICE

CROSS-REFERENCE TO RELATED APPLICATION

This application is a 371 application of an international PCT application serial no. PCT/JP2018/044036, filed on Nov. 29, 2018, which claims the priority benefit of Japan application JP2017-232368, filed on Dec. 4, 2017. The entirety of each of the above-mentioned patent applications is hereby incorporated by reference herein and made a part of this specification.

TECHNICAL FIELD

The present invention relates to a fine bubble elimination method and a fine bubble elimination device for reducing fine bubbles in target liquid including a fine bubble, and a bubble size distribution measuring method and a bubble size distribution measuring device.

BACKGROUND ART

In recent years, research and use of fine bubbles such as a microbubble and an ultrafine bubble have been actively conducted. Fine bubbles are minute bubbles having a bubble diameter of, for example, 100 µm or less, and those having a bubble diameter of 1 µm or more are called microbubbles, and those having a bubble diameter of less than 1 µm are called ultrafine bubbles. Fine bubbles have a characteristic that a residence time in liquid is long. In particular, ultrafine bubbles are known to stay in liquid for several months.

Fine bubbles are expected to have various effects such as a cleaning effect and a sterilizing effect. For example, if various facilities are cleaned using fine bubbles in a factory, a plant, a public toilet, and the like, an amount of detergent to be used can be reduced. For this reason, a cleaning method using fine bubbles has attracted attention as a new environmentally friendly cleaning method.

A relationship between the characteristic and effect of the fine bubbles as described above depends on a bubble diameter and bubble amount (concentration) of the fine bubbles. In view of the above, a technique for measuring bubble size distribution (particle size distribution) of fine bubbles using a laser diffraction particle size analyzer or the like has been proposed (for example, see Patent Document 1 below).

PRIOR ART DOCUMENT

Patent Document

Patent Document 1: Japanese Patent Laid-Open No. 2007-263876

SUMMARY OF THE INVENTION

Problems to be Solved by the Invention

However, liquid to be measured (target liquid) may include solid particles such as dust or soil, or liquid particles such as oil or emulsion, in addition to fine bubbles. In such a case, in the method of measuring bubble size distribution of fine bubbles using a particle size distribution measuring device, there is possibility that fine bubbles cannot be distinguished from solid particles and liquid particles, and bubble size distribution of fine bubbles cannot be measured accurately.

Further, regardless of whether or not to measure bubble size distribution of fine bubbles in target liquid, there is a case where fine bubbles in target liquid need to be reduced, and a technique that can reduce fine bubbles efficiently in such a case is desired.

The present invention has been made in view of the above circumstances, and an object of the present invention is to provide a fine bubble elimination method and a fine bubble elimination device capable of efficiently reducing fine bubbles in target liquid. Another object of the present invention is to provide a bubble size distribution measuring method and a bubble size distribution measuring device capable of accurately measuring bubble size distribution of fine bubbles.

Means for Solving the Problems (1) A fine bubble elimination method according to the present invention includes an ultrasonic irradiation step of irradiating target liquid containing fine bubbles with an ultrasonic wave from an ultrasonic irradiation device to reduce the fine bubbles in the target liquid.

According to such a configuration, by irradiating target liquid with ultrasonic waves, fine bubbles in the target liquid can be reduced effectively. By using ultrasonic waves, bubbles with small diameters, such as, particularly fine bubbles, can be effectively reduced, so that fine bubbles in target liquid can be efficiently reduced.

(2) The ultrasonic irradiation step preferably irradiates target liquid with an ultrasonic wave having a frequency of 430 kHz or more.

According to such a configuration, it is possible to more efficiently reduce fine bubbles in target liquid by using ultrasonic waves of an optimum frequency. There is a case where the number of fine bubbles in target liquid increases to the contrary depending on a frequency of ultrasonic waves. Accordingly, by using ultrasonic waves of an optimum frequency, fine bubbles in target liquid can be ensured to be reduced.

(3) The fine bubble elimination method may further include a container installing step of installing a container containing target liquid at an installation position. In this case, the ultrasonic irradiation step may irradiate target liquid installed at the installation position with ultrasonic waves.

According to such a configuration, fine bubbles in the target liquid can be easily reduced only by installing a container at the installation position and irradiating the container with ultrasonic waves from an ultrasonic irradiation device. In order to efficiently reduce fine bubbles with ultrasonic waves, a distance between the container and the ultrasonic irradiation device needs to be set appropriately. Accordingly, by setting the installation position of the container appropriately, fine bubbles can be efficiently reduced.

(4) A lower part of the container installed at the installation position is preferably positioned close to an antinode in a standing wave of an ultrasonic wave emitted from the ultrasonic irradiation device.

According to such a configuration, it is possible to optimally set a distance between the container and the ultrasonic irradiation device, and to reduce fine bubbles in target liquid more efficiently.

(5) A gap is preferably formed above target liquid in the container.

According to such a configuration, gas generated by reduction of fine bubbles in target liquid can be released to the gap formed above the target liquid, so that the gas can be prevented from being dissolved in the target liquid again.

(6) The fine bubble elimination method preferably further includes a standing step of allowing target liquid to stand for a certain period of time after the ultrasonic irradiation step irradiates the target liquid with an ultrasonic wave.

According to such a configuration, by allowing the target liquid after being irradiated with ultrasonic waves to stand for a certain period of time, fine bubbles in the target liquid can be reduced effectively.

(7) A highly soluble additive is preferably added to the target liquid.

According to such a configuration, by adding a highly soluble additive to target liquid, fine bubbles in the target liquid can be more efficiently reduced.

(8) The ultrasonic irradiation step may irradiate target liquid having a reduced surface tension due to inclusion of fine bubbles with an ultrasonic wave to reduce the fine bubbles in the target liquid, so that a surface tension of the target liquid is increased.

According to such a configuration, after target liquid with a low surface tension that contains fine bubbles is used to perform processing using its characteristics, the fine bubbles in the target liquid are reduced only by irradiating the target liquid with ultrasonic waves, and the surface tension of the target liquid can be restored to that of original liquid. Further, in a case where there are a large number of particles (foreign matters) other than fine bubbles contained in target liquid and it is not possible to directly measure bubble size distribution of the fine bubbles, the fine bubbles in the target liquid can be reduced only by irradiation of the target liquid with ultrasonic waves, and the original surface tension of the liquid can be restored. Accordingly, the presence of fine bubbles can be indirectly confirmed (estimated) based on a change in the surface tension.

(9) The ultrasonic irradiation step may adjust a reduction amount of fine bubbles in target liquid by adjusting at least one of a frequency, irradiation time, and irradiation intensity of an ultrasonic wave emitted from the ultrasonic irradiation device.

According to such a configuration, a reduction amount of fine bubbles in target liquid can be optionally adjusted by adjusting at least one of a frequency, irradiation time, and irradiation intensity of an ultrasonic wave emitted from the ultrasonic irradiation device. Therefore, in a case where the surface tension of the target liquid is increased by reducing the number of fine bubbles in the target liquid, the target liquid can be caused to have a desired surface tension by optionally adjusting a reduction amount of the fine bubbles.

(10) The fine bubble elimination method may further include a target liquid acquiring step of acquiring target liquid containing fine bubbles by restoring a lyophilized target object. In this case, the ultrasonic irradiation step may irradiate target liquid acquired by the target liquid acquiring step with an ultrasonic wave.

According to such a configuration, fine bubbles in target liquid obtained by restoring a lyophilized target object can be reduced using ultrasonic waves. For example, in a case where lyophilized protein is restored, fine bubbles generated at that time may cause aggregation. However, by reducing the fine bubbles using ultrasonic waves, aggregation can be prevented.

(11) A fine bubble elimination device according to the present invention includes an ultrasonic irradiation device that irradiates target liquid containing fine bubbles with an ultrasonic wave to reduce the fine bubbles in the target liquid.

(12) A bubble size distribution measuring method according to the present invention measures bubble size distribution of fine bubbles contained in target liquid based on data on particle size distribution of the target liquid having fine bubbles reduced by the fine bubble elimination method, and data on particle size distribution of the target liquid before the fine bubbles are reduced.

According to such a configuration, bubble size distribution of fine bubbles can be accurately measured based on data on particle size distribution of target liquid before ultrasonic irradiation including fine bubbles, solid particles, and liquid particles, and data on particle size distribution of the target liquid after ultrasonic irradiation including only solid particles and liquid particles.

(13) A bubble size distribution measuring device according to the present invention measures bubble size distribution of fine bubbles contained in target liquid based on data on particle size distribution of the target liquid having fine bubbles reduced by the fine bubble elimination method, and data on particle size distribution of the target liquid before the fine bubbles are reduced.

Effects of the Invention

According to the present invention, by using ultrasonic waves, bubbles with small diameters can be effectively reduced, so that fine bubbles in target liquid can be efficiently reduced.

Figure 4:
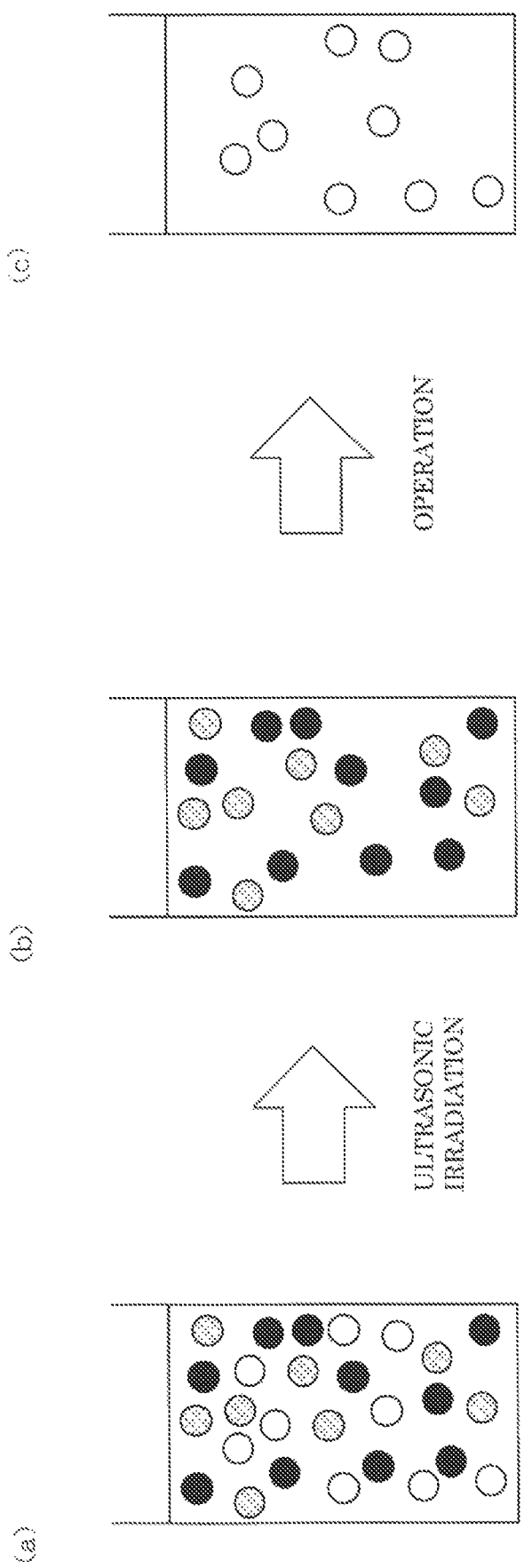

(a) to (c) of FIG. 4 are diagrams for explaining a mode when bubble size distribution of fine bubbles is measured, and conceptually shows a state of particles in target liquid before and after ultrasonic irradiation and after calculation.

Figure 5:
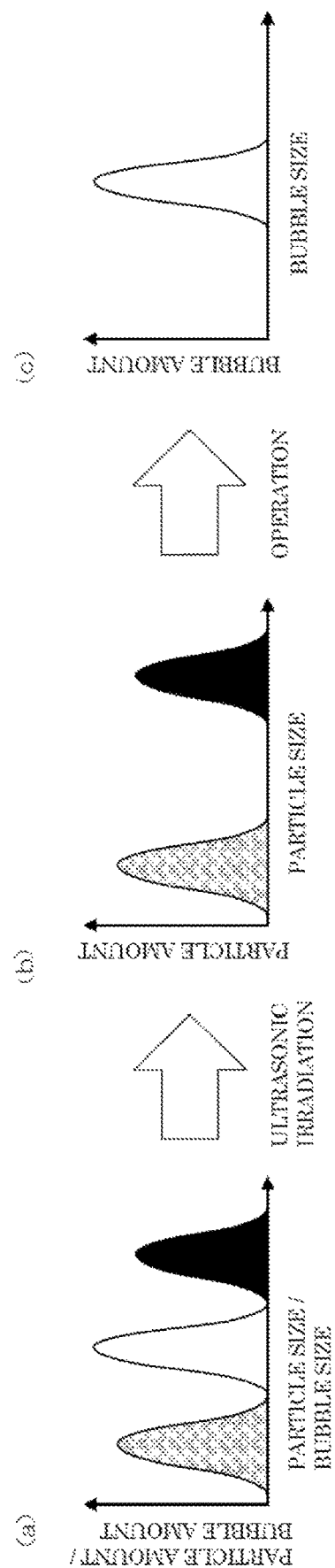

(a) to (c) of FIG. 5 are views for explaining a mode when bubble size distribution of fine bubbles is measured, and schematically shows particle size distribution and bubble size distribution in each state of (a) to (c) of FIG. 4.

Figure 6:
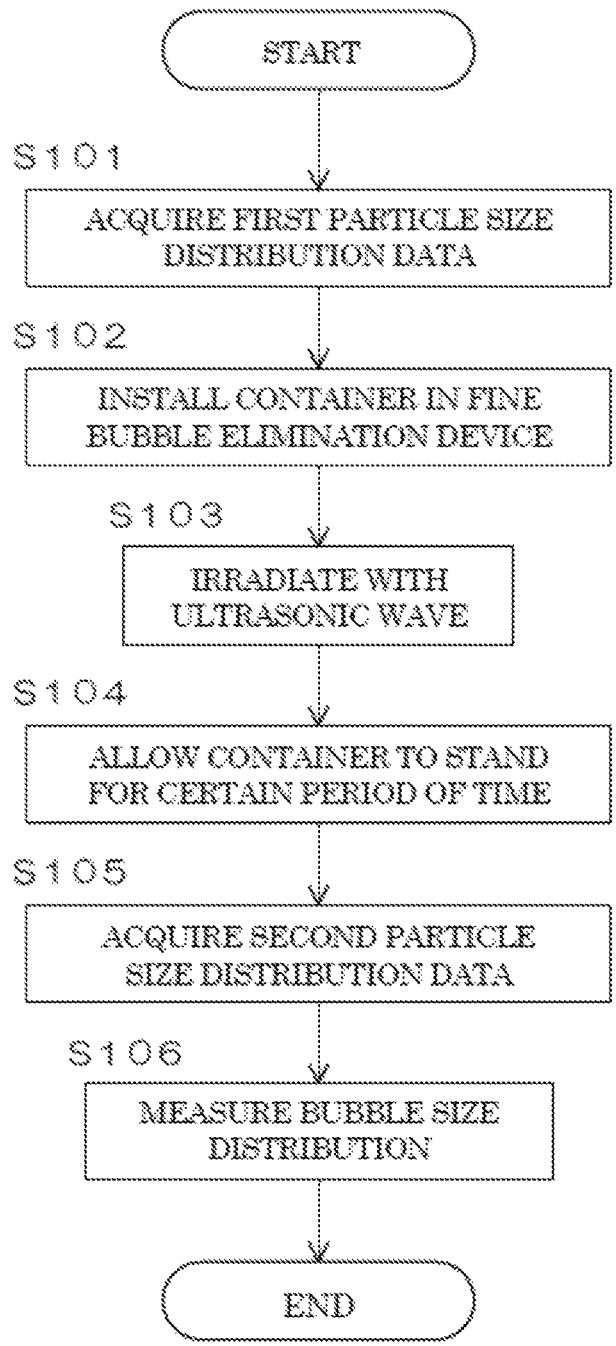

FIG. 6 is a flowchart showing a process when bubble size distribution of fine bubbles contained in target liquid is measured.

MODE FOR CARRYING OUT THE INVENTION

1. Configuration of Bubble Size Distribution Measuring Device

Figure 1:
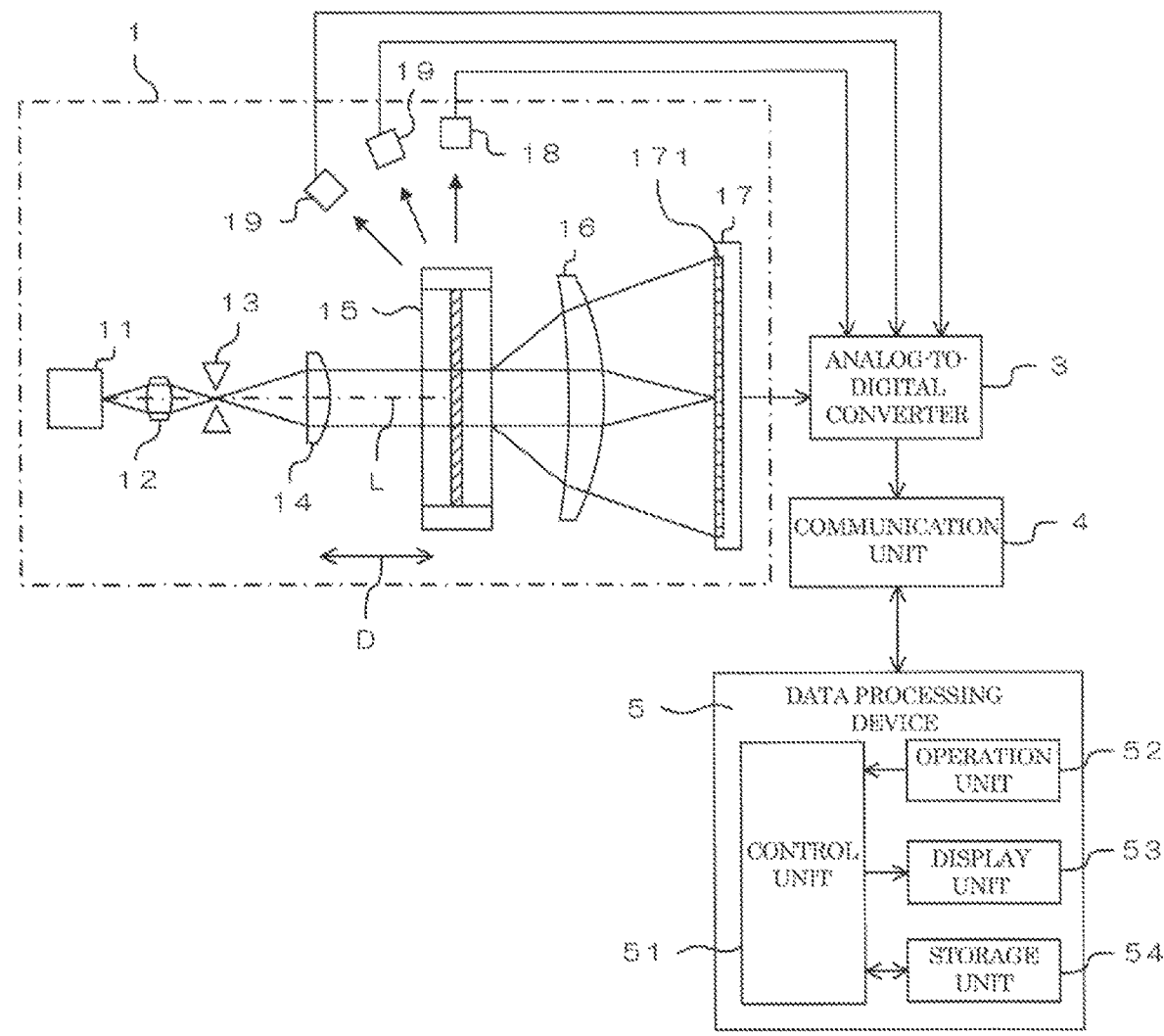
FIG. 1 is a diagram showing a configuration example of a bubble size distribution measuring device according to one embodiment of the present invention.

FIG. 1 is a diagram showing a configuration example of a bubble size distribution measuring device according to one embodiment of the present invention. This bubble size distribution measuring device is, for example, a laser diffraction particle size analyzer. That is, in the present embodiment, bubble size distribution (particle size distribution) of gas particles contained in target liquid is measured using a particle size distribution measuring device for measuring particle size distribution of solid particles and liquid particles.

The target liquid is, for example, a sample using any liquid such as alcohol or oil as a medium in addition to water and contains fine bubbles composed of minute bubbles having a bubble diameter of 100 μm or less. Specifically, at least one of an ultrafine bubble having a bubble diameter of less than 1 μm and a microbubble having a bubble diameter of 1 μm or more is contained in the target liquid as a gas particle. Gas constituting the gas particle may be air, or may be gas other than air, for example, ozone or hydrogen. Further, the target liquid contains solid particles and liquid particles in addition to fine bubbles.

The bubble size distribution measuring device according to the present embodiment includes a light intensity measurement unit 1 that irradiates the target liquid with laser light and measures the intensity of diffracted and scattered light (diffracted and scattered laser light) from the target liquid. The light intensity measurement unit 1 includes a light source 11, a condenser lens 12, a spatial filter 13, a collimator lens 14, a sample cell 15, a condenser lens 16, a photodiode array 17, a side sensor 18, a plurality of rear sensors 19, and the like. The target liquid to be measured is supplied to the sample cell 15 each time measurement is performed. That is, the sample cell 15 used in the present embodiment is what is called a batch cell.

The light source 11 is, for example, a laser light source. Laser light emitted from the light source 11 passes through the condenser lens 12, the spatial filter 13, and the collimator lens 14, so as to become parallel light. The laser light thus converted into parallel light is applied to the sample cell 15 to which the target liquid is supplied, is diffracted and scattered by a particle group (including solid particles, liquid particles, and gas particles) contained in a sample in the sample cell 15, and, after that, is received by the photodiode array 17 through the condenser lens 16.

The photodiode array 17 is disposed in front of the sample cell 15 (opposite side to the light source 11 side) as viewed from the light source 11 side. In this manner, each of a plurality of light receiving elements provided in the photodiode array 17 constitutes sensor elements 171. The photodiode array 17 constitutes a detector for detecting diffracted and scattered light (diffraction light and scattered light) from the target liquid in the sample cell 15.

The photodiode array 17 in the present embodiment is a ring detector constituted by disposing a plurality of (for example, 64) the sensor elements 171, in which ring-shaped or semi-ring-shaped detection surfaces having different radii are formed, concentrically around an optical axis of the condenser lens 16, and, on each of the sensor elements 171, light at a diffraction and scattering angle corresponding to each position is incident. Therefore, a detection signal of each of the sensor elements 171 of the photodiode array 17 indicates the intensity of light at each diffraction and scattering angle.

On the other hand, the side sensor 18 is disposed on the side of the sample cell 15 when viewed from the light source 11 side. In this example, the sample cell 15 is formed of a thin hollow member, and is disposed so that a thickness direction D of the sample cell 15 is parallel to an optical axis L of laser light incident from the light source 11. The side sensors 18 are disposed side by side, for example, in a direction perpendicular to the thickness direction D with respect to the sample cell 15.

In FIG. 1, the side sensor 18 is disposed above the sample cell 15. However, the configuration is not limited to the above, and the side sensor 18 may be disposed at an optional position in a plane orthogonal to the thickness direction D of the sample cell 15, such as below, right, and left of the sample cell 15. In this manner, the side sensor 18 can receive the diffracted and scattered light in a direction orthogonal to the thickness direction D. However, the configuration is not limited to one in which the side sensor 18 receives the diffracted and scattered light in a direction at 90° with respect to the thickness direction D, but may be one in which the side sensor 18 receives diffracted and scattered light in a direction at 70° to 110°, more preferably 80° to 100°, with respect to the thickness direction D.

A plurality of the rear sensors 19 are disposed behind the sample cell 15 (on the light source 11 side) when viewed from the light source 11 side. In this manner, each of the rear sensors 19 can receive diffracted and scattered light to the rear of the side sensor 18. Each of the rear sensors 19 is disposed at different angles with respect to the sample cell 15, so that diffracted and scattered light incident at different angles can be received. In this example, two of the rear sensors 19 are provided. However, the configuration is not limited to this, and, for example, one or three or more of the rear sensors 19 may be provided.

Detection signals of the sensor elements 171, the side sensor 18, and the rear sensors 19 of the photodiode array 17 are converted from an analog signal to a digital signal by an A/D (analog-to-digital) converter 3, and then input to a data processing device 5 through a communication unit 4. In this manner, received light intensity of the sensors 171, 18, and 19 is input to the data processing device 5 in association with element numbers of the sensors 171, 18, and 19.

The data processing device 5 is for processing data when particle size distribution of the target liquid is measured, and is configured with, for example, a personal computer. The data processing device 5 includes a control unit 51, an operation unit 52, a display unit 53, a storage unit 54, and the like. The data processing device 5 constitutes a bubble size distribution measuring device integrally with the light intensity measurement unit 1 or the like, or may be provided as a bubble size distribution measuring device separated from the light intensity measurement unit 1 or the like.

The control unit 51 has a configuration including, for example, a central processing unit (CPU), and units such as the operation unit 52, the display unit 53, and the storage unit 54 are electrically connected. The operation unit 52 has a configuration including, for example, a keyboard and a mouse, and an operator can perform input operation or the like by operating the operation unit 52.

The display unit 53 can be configured with, for example, a liquid crystal display, and an operator can perform work while checking displayed content on the display unit 53. The storage unit 54 can be configured with, for example, a read only memory (ROM), a random access memory (RAM), a hard disk, and the like.

Particle size distribution data of the target liquid is generated by the control unit 51 performing an operation based on light intensity distribution data obtained by measurement of the target liquid in the light intensity measurement unit 1. When particle size distribution data is generated, a relationship of following Equation (1) can be used:

[Equation 1]

$$s = Aq \qquad (1)$$

where, s, q, and A are represented by following Equations (2) to (4):

[Equation 2]

$$s = \begin{bmatrix} s_1 \\ s_2 \\ \vdots \\ s_m \end{bmatrix} \quad (2)$$

$$q = \begin{bmatrix} q_1 \\ q_2 \\ \vdots \\ q_h \end{bmatrix} \quad (3)$$

$$A = \begin{bmatrix} a_{1.1} & a_{2.1} & \cdots & a_{1.n} \\ a_{2.1} & & & \vdots \\ \vdots & & a_{i.j} & \vdots \\ a_{m.1} & \cdots & \cdots & a_{m.n} \end{bmatrix} \quad (4)$$

The vector s is light intensity distribution data. Each element $s_i$ (i=1, ..., m) in the vector s is detected intensity of the sensor elements 171, the side sensor 18, and the rear sensors 19 of the photodiode array 17.

The vector q is particle size distribution data expressed as frequency distribution %. If a particle diameter range to be measured (a maximum particle diameter is $x_1$, a minimum particle diameter is $x_{n+1}$) is divided into n, and each particle diameter section is [$x_j$, $x_{j+1}$], each element $q_j$ (j=1, 2, ..., n) in the above vector q is a particle amount corresponding to each of the particle diameter sections [$x_j$, $x_{j+1}$].

Normally, a volume standard is used, and normalization is performed so that following Equation (5) is satisfied, that is, the sum of the elements $q_j$ becomes 100%:

[Equation 3]

$$\sum_{j=1}^{n} q_j = 100\% \quad (5)$$

In the present embodiment, bubble size distribution of fine bubbles contained in the target liquid is measured using particle size distribution data before and after the target liquid is irradiated with ultrasonic waves. In order to compare first particle size distribution data before ultrasonic irradiation and second particle size distribution data after ultrasonic irradiation, for example, a particle amount and a bubble amount in the form of volume concentration (unit: μL/mL) need to be obtained. By performing calibration using a standard sample having a known particle amount such as polystyrene latex (PSL) particles, particle size distribution based on a comparable particle amount can be obtained.

The matrix A is a coefficient matrix for converting the particle size distribution data q into the light intensity distribution data s. Each element $a_{i,j}$ (i=1, 2, ..., m, j=1, 2, ..., n) in the matrix A is detected intensity at an i-th element of light diffracted and scattered by a particle group of a unit particle amount belonging to each of the particle diameter sections [$x_j$, $x_{j+1}$].

A value of each of the elements $a_{i,j}$ in the matrix A can be theoretically calculated in advance using a refractive index as one of the parameters. At this time, a value of each of the elements $a_{i,j}$ is preferably calculated using a refractive index of gas constituting gas particles. The value of each of the elements $a_{i,j}$ is calculated using the Fraunhofer diffraction theory or the Mie scattering theory. For example, in a case where a particle diameter is sufficiently larger (for example, 10 times or more) than a wavelength of laser light from the light source 11, the value of each of the elements $a_{i,j}$ can be calculated using the Fraunhofer diffraction theory. On the other hand, in a case where the particle diameter is about the same as or smaller than the wavelength of the laser light from the light source 11, the value of each of the elements $a_{i,j}$ can be calculated using the Mie scattering theory.

When the value of each of the elements $a_{i,j}$ in the matrix A is obtained in the above manner, the particle size distribution data q can be obtained by Equation (6) below based on above Equation (1). In the equation, $A^T$ is a transposed matrix of A.

[Equation 4]

$$q = (A^T A)^{-1} A^T s \quad (6)$$

2. Configuration of Fine Bubble Elimination Device

Figure 2:
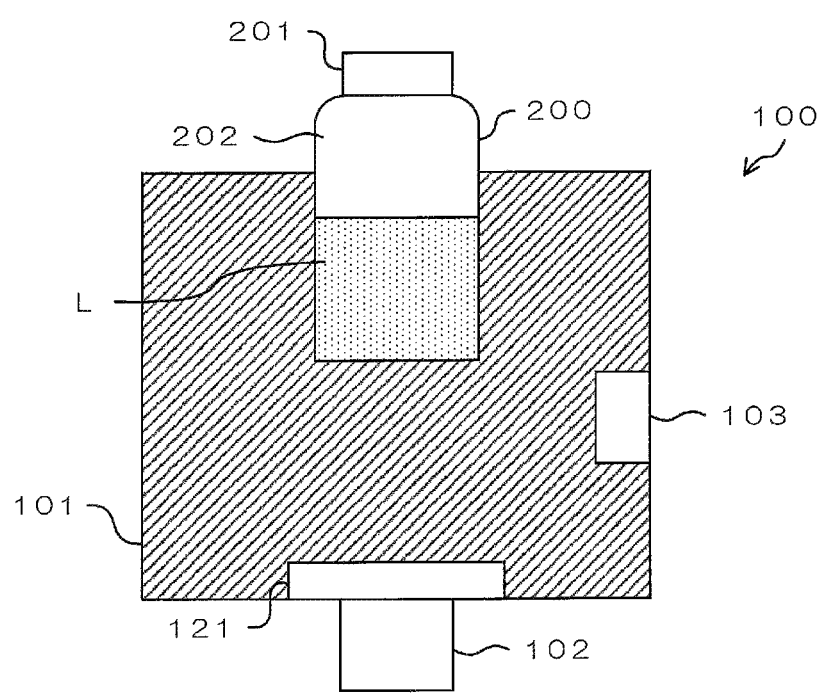
FIG. 2 is a schematic cross-sectional view showing a configuration example of a fine bubble elimination device according to one embodiment of the present invention.

FIG. 2 is a schematic cross-sectional view showing a configuration example of a fine bubble elimination device 100 according to one embodiment of the present invention. The fine bubble elimination device 100 is a device for irradiating target liquid L with ultrasonic waves to reduce fine bubbles in the target liquid L. By the fine bubble elimination device 100 irradiating the target liquid L with ultrasonic waves and the light intensity measurement unit 1 (see FIG. 1) measuring intensity of diffracted and scattered light from the target liquid L before and after the ultrasonic irradiation, bubble size distribution of fine bubbles contained in the target liquid L can be measured by operation based on obtained light intensity distribution data.

The fine bubble elimination device 100 includes a container installation unit 101, an ultrasonic irradiation device 102, a temperature adjustment device 103, and the like. The target liquid L in a state of being stored in a container 200 is installed in the container installation unit 101 of the fine bubble elimination device 100. The container installation unit 101 is configured with a hollow housing, and is filled with water. At least a lower part of the container 200 installed in the container installation unit 101 contacts the water in the container installation unit 101. However, liquid with which the container installation unit 101 is filled may be liquid other than water.

The container 200 containing the target liquid L is installed at a predetermined installation position as shown in FIG. 2, and the ultrasonic irradiation device 102 irradiates the target liquid L installed at the installation position with ultrasonic waves. In this manner, fine bubbles in the target liquid L can be easily reduced only by installing the container 200 at the installation position and irradiating the container 200 with ultrasonic waves from the ultrasonic irradiation device 102. In order to efficiently reduce fine bubbles with ultrasonic waves, a distance between the container 200 and the ultrasonic irradiation device 102 needs to be set appropriately. Accordingly, by setting the installation position of the container 200 appropriately, fine bubbles can be efficiently reduced.

The ultrasonic irradiation device 102 includes an ultrasonic transducer 121 that comes into contact with water in the container installation unit 101. As the ultrasonic transducer 121 generates ultrasonic waves, the ultrasonic waves are transmitted to the target liquid L stored in the container 200 via the water in the container installation unit 101. As described above, by irradiating the target liquid L containing fine bubbles with ultrasonic waves from the ultrasonic irradiation device 102, the fine bubbles in the target liquid L can be reduced.

number concentrations, and a residual ratio D (=B/A) of the particles of the target liquid L before and after the ultrasonic irradiation are shown in association with the conditions 1 to 4.

TABLE 1

| Condition | Number concentration (per ml) A in target liquid before ultrasonic irradiation | Number concentration (per ml) B in target liquid after ultrasonic irradiation | Difference C in number concentrations (per ml) = A − B | Residual ratio (%) D = B/A |
|---|---|---|---|---|
| Condition1 | 1.8E+08 | 1.0E+08 | 0.8E+08 | 56 |
| Condition2 | 1.8E+08 | 0.006E+08 | 1.8E+08 | 0.3 |
| Condition3 | 1.8E+08 | 1.6E+08 | 0.2E+08 | 89 |
| Condition4 | 1.8E+08 | 1.2E+08 | 0.6E+08 | 67 |

The temperature adjustment device 103 adjusts the temperature of the water in the container installation unit 101 by heating or cooling the water. A period of the ultrasonic waves transmitted from the ultrasonic irradiation device 102 to the target liquid L changes according to the temperature of the water interposed between them. Therefore, by adjusting the temperature of the water in the container installation unit 101 using the temperature adjustment device 103, the period of the ultrasonic waves with which the target liquid L is irradiated can be optionally set.

The temperature of the target liquid L contained in the container 200 increases with the irradiation of the ultrasonic waves from the ultrasonic irradiation device 102. When the temperature of the target liquid L increases, an amount of residual oxygen in the target liquid L decreases, and fine bubbles are possibly generated. In view of the above, generation of fine bubbles can be prevented as the temperature inside the container installation unit 101 is adjusted by the temperature adjustment device 103 and the target liquid L is controlled to be at room temperature.

An opening is formed on an upper surface of the container 200, and the opening is blocked by a lid 201. The lid 201 is detachable from the container 200. Accordingly, the lid 201 can be eliminated from the container 200 so that the target liquid L can be stored in the container 200, and the lid 201 can be attached to the container 200 so that the inside of the container 200 can be sealed.

When the target liquid L is stored in the container 200, the container 200 is not filled with the target liquid L completely up to the upper surface opening of the container 200, but the target liquid L is stored up to a water level lower than the upper surface opening. Therefore, a gap 202 is formed above the target liquid L in the container 200. In this manner, gas generated by reduction of fine bubbles in the target liquid L can be released to the gap 202 formed above the target liquid L, so that the gas can be prevented from being dissolved in the target liquid L again. Such an effect can be obtained not only in the configuration in which the gap 202 is formed above the target liquid L, but also in a configuration in which the lid 201 is not provided.

3. Elimination of Fine Bubbles by Ultrasonic Irradiation

Hereinafter, a result of irradiating the same target liquid L with ultrasonic waves under different conditions (conditions 1 to 4) and measuring number concentration of particles in the target liquid L before and after ultrasonic irradiation will be described.

In Table 1 below, number concentration A of particles in the target liquid L before ultrasonic irradiation, number concentration B of the particles in the target liquid L after ultrasonic irradiation, a difference C(=A−B) between the The conditions 1 to 4 are as shown in Table 2 below.

TABLE 2

| Condition | Ultrasonic frequency (kHz) | Standing after ultrasonic irradiation | Sample amount (mL) | Residual ratio (%) |
|---|---|---|---|---|
| Condition1 | 1600 | None | 20 | 56 |
| Condition2 | 1600 | 8 days | 20 | 0.3 |
| Condition3 | 430 | None | 20 | 89 |
| Condition4 | 1600 | None | 30 | 67 |

A frequency of the ultrasonic waves emitted from the ultrasonic irradiation device 102 was 1600 kHz under the conditions 1, 2, and 4, and 430 kHz under the condition 3. With respect to the target liquid L after irradiation with the ultrasonic waves, the number concentration B was measured after standing for three days under the condition 2, and the number concentration B was measured without standing under the conditions 1, 3, and 4. Further, under the conditions 1, 2, and 3, a sample amount (an amount of the target liquid L) was the same, and, under the condition 4, the sample amount was set to be larger than that under the conditions 1, 2, and 3 so that the gap 202 was not provided in the container 200. Note that the volume of the container 200 containing the target liquid L is 30 mL, and the ultrasonic irradiation time is 15 minutes.

The measurement results shown in Tables 1 and 2 show that the number concentration of particles (number concentration of fine bubbles) in the target liquid L is reduced by the irradiation of the ultrasonic waves under any of the conditions 1 to 4. As described above, by irradiating the target liquid L with ultrasonic waves, the fine bubbles in the target liquid L can be reduced effectively. By using ultrasonic waves, bubbles with small diameters, particularly fine bubbles, can be effectively reduced, so that fine bubbles in the target liquid L can be efficiently reduced.

A frequency of the ultrasonic waves emitted from the ultrasonic irradiation device 102 is preferably 430 kHz or more. A similar experiment was performed with the frequency of the ultrasonic waves set to 200 kHz, but it was confirmed that the number of fine bubbles in the target liquid L was increased by ultrasonic irradiation. As described above, by setting the frequency of the ultrasonic waves to 430 kHz or more, it is possible to more efficiently reduce fine bubbles in the target liquid L by using the ultrasonic waves of an optimum frequency. As described above, there is a case where the number of fine bubbles in the target liquid L increases to the contrary depending on the frequency of the ultrasonic waves. Accordingly, by using the ultrasonic waves of an optimum frequency, fine bubbles in the target liquid L can be ensured to be reduced.

After the target liquid L is irradiated with ultrasonic waves, the target liquid L is preferably allowed to stand for a certain period of time. As is clear from the measurement result obtained under the condition 2, when the target liquid L after being irradiated with ultrasonic waves is allowed to stand for three days, a residual ratio of fine bubbles is drastically reduced. Therefore, by allowing the target liquid L after being irradiated with ultrasonic waves to stand for a certain period of time, fine bubbles in the target liquid L can be reduced effectively. However, the time period during which the target liquid L is allowed to stand after the ultrasonic irradiation is preferably at least one hour or more, more preferably one day or more, and even more preferably three days or more.

Figure 3:
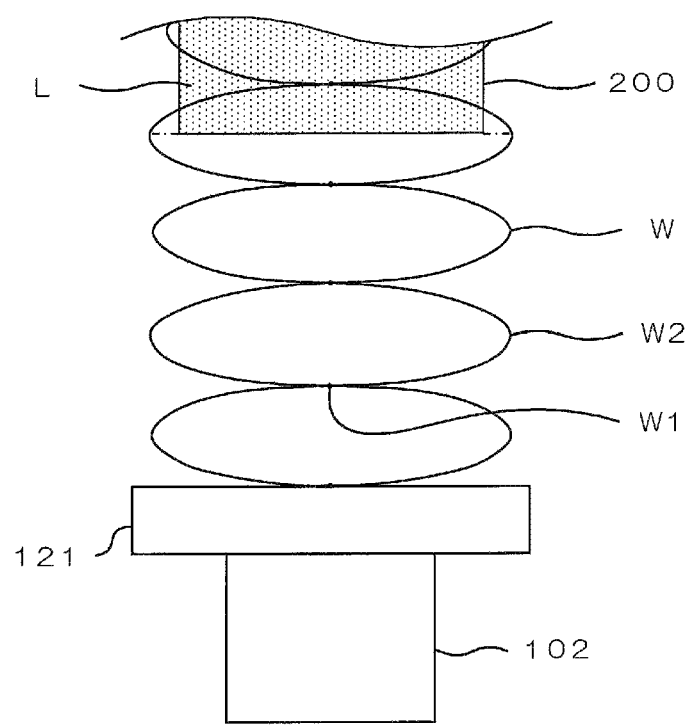
FIG. 3 is a diagram for explaining a distance between an ultrasonic irradiation device and a container.

FIG. 3 is a diagram for explaining a distance between the ultrasonic irradiation device 102 and the container 200. Although FIG. 3 shows a waveform W of a standing wave of the ultrasonic waves emitted from the ultrasonic irradiation device 102, the waveform W is only schematically shown to facilitate understanding.

As shown in FIG. 3, a node W1 having a smallest amplitude and an antinode W2 having a largest amplitude alternately appear at a constant period in the waveform W of the standing wave of the ultrasonic waves emitted from the ultrasonic irradiation device 102. In the present embodiment, a lower part (for example, a bottom surface) of the container 200 is positioned in the vicinity of the antinode W2 in the standing wave of the ultrasonic waves emitted from the ultrasonic irradiation device 102.

As described above, by aligning the position of the antinode W2 in the standing wave of the ultrasonic waves with the lower part of the container 200, irradiation efficiency of the ultrasonic waves applied to the target liquid L in the container 200 is improved, and fine bubbles in the target liquid L can be efficiently reduced. Therefore, it is possible to optimally set the distance between the container 200 and the ultrasonic irradiation device 102, and to reduce fine bubbles in the target liquid L more efficiently.

The position of the antinode W2 in the standing wave of the ultrasonic waves as described above can be aligned with the lower part of the container 200 by adjusting the installation position of the container 200 in the container installation unit 101 so as to adjust the distance between the ultrasonic irradiation device 102 and the container 200. Further, without limitation to such a configuration, by adjusting the temperature of the water in the container installation unit 101 using the temperature adjustment device 103, a period of the ultrasonic waves transmitted from the ultrasonic irradiation device 102 to the target liquid L can be adjusted, so that the position of the antinode W2 in the standing wave of the ultrasonic waves can be aligned with the lower part of the container 200.

An additive having high solubility is preferably added to the target liquid L. Specifically, an additive such as sodium chloride, magnesium chloride, potassium chloride, or calcium chloride is preferably added to the target liquid L and sufficiently dissolved, and then irradiation with ultrasonic waves is preferably performed. As described above, by adding a highly soluble additive to the target liquid L, fine bubbles in the target liquid L can be more efficiently reduced.

Further, the container 200 containing the target liquid L is preferably formed of a material that does not easily absorb ultrasonic waves. For example, if the bottom surface of the container 200 is formed of flat glass, the ultrasonic waves from the ultrasonic irradiation device 102 can be efficiently transmitted to the target liquid L in the container 200.

4. Measurement of bubble size distribution of fine bubbles (a) to (c) of FIG. 4 and (a) to (c) of FIG. 5 are diagrams for explaining a mode when bubble size distribution of fine bubbles is measured. (a) to (c) of FIG. 4 conceptually shows a state of particles in the target liquid L before and after the ultrasonic irradiation and after an operation. (a) to (c) of FIG. 5 schematically shows particle size distribution and bubble size distribution in the states of (a) to (c) of FIG. 4. (a) to (c) of FIG. 5 shows a relationship between a particle diameter and a particle amount of solid particles and liquid particles contained in the target liquid L, and a relationship between a bubble diameter and a bubble amount of gas particles contained in the target liquid L.

The target liquid L before ultrasonic irradiation contains fine bubbles, solid particles, and liquid particles. Gas particles other than fine bubbles, that is, gas particles having a bubble diameter exceeding 100 μm, cannot stay in the target liquid L for a long time, and diffuse into the atmosphere in a relatively short time. For this reason, usually, gas particles contained in the target liquid L may be considered to be only fine bubbles (particularly, ultrafine bubbles) having a bubble diameter of 100 μm or less.

The solid particles and the liquid particles are classified into particles having a lower specific gravity than liquid and particles having a higher specific gravity than liquid. Both of the particles stay in the target liquid L and do not diffuse into the atmosphere. Therefore, as shown in (a) of FIG. 4, the target liquid L before ultrasonic irradiation is in a state in which fine bubbles, particles having a lower specific gravity than liquid, and particles having a higher specific gravity than liquid are mixed.

In a case where ultrasonic irradiation is performed for the target liquid L, as shown in (b) of FIG. 4, fine bubbles in the target liquid L are eliminated by the ultrasonic waves and diffused into the gap 202 in the container 200. Accordingly, the fine bubbles no longer exist in the target liquid L. On the other hand, solid particles and liquid particles are maintained in a state of staying in the target liquid L regardless of whether or not the ultrasonic irradiation is performed.

That is, the target liquid L before ultrasonic irradiation contains fine bubbles, solid particles, and liquid particles. However, the target liquid L after ultrasonic irradiation contains only solid particles and liquid particles. Therefore, by performing an operation of subtracting particle size distribution data measured in the state of (b) of FIG. 4 from particle size distribution data measured in the state of (a) of FIG. 4, bubble size distribution of the fine bubbles in the target liquid L can be calculated as conceptually shown in (c) of FIG. 4.

For example, in a case where the particle size distribution data measured in the state of (a) of FIG. 4 is data as shown in (a) of FIG. 5, and the particle size distribution data measured in the state of (b) of FIG. 4 is data as shown in (b) of FIG. 5, bubble size distribution data as shown in (c) of FIG. 5 can be obtained by performing an operation of subtracting the particle size distribution data from each other. The above operation can be performed, for example, by subtracting values of the elements $q_j$ from each other in the particle size distribution data q represented by above-described Equation (3).

As described above, in the present embodiment, the bubble size distribution of fine bubbles (see (c) of FIG. 5) can be accurately measured based on particle size distribution data (see (a) of FIG. 5) of the target liquid L before ultrasonic irradiation including fine bubbles, solid particles, and liquid particles, and particle size distribution data (see (b) of FIG. 5) of the target liquid L after ultrasonic irradiation including only solid particles and liquid particles. This makes it possible to quantitatively evaluate a relationship between an expected effect of fine bubbles such as cleaning, sterilization, bioactivation, or the like and bubble size distribution of fine bubbles. Further, it is possible to identify bubble size distribution of fine bubbles that is most suitable for a purpose and a target, and to contribute to establishment of a certification system for fine bubbles.

FIG. 6 is a flowchart showing a process when bubble size distribution of fine bubbles contained in the target liquid L is measured. When bubble size distribution is measured, first, particle size distribution data of the target liquid L before ultrasonic irradiation is obtained (Step S101: first data acquiring step). At this time, light intensity distribution data is obtained as the target liquid L before ultrasonic irradiation as shown in (a) of FIG. 4 is irradiated with light in the light intensity measurement unit 1, and, based on the light intensity distribution data, particle size distribution data as shown in (a) of FIG. 5 is calculated.

After the above, the container 200 containing the target liquid L is installed in the fine bubble elimination device 100 (Step S102: container installing step). In this manner, the container 200 is installed at an installation position in the container installation unit 101, and a distance between the container 200 and the ultrasonic irradiation device 102 is optimally set. Then, the target liquid L in the container 200 installed at the installation position is irradiated with ultrasonic waves (Step S103: ultrasonic irradiation step), and the target liquid L after the ultrasonic irradiation is allowed to stand for a certain period of time (Step S104: standing step).

Particle size distribution data is acquired again using the target liquid L after such ultrasonic irradiation (after being allowed to stand for a certain period of time) (Step S105: second data acquiring step). At this time, light intensity distribution data is obtained as the target liquid L after ultrasonic irradiation as shown in (b) of FIG. 4 is irradiated with light in the light intensity measurement unit 1, and, based on the light intensity distribution data, particle size distribution data as shown in (b) of FIG. 5 is calculated.

Then, based on the particle size distribution data (first particle size distribution data) acquired in Step S101 and the particle size distribution data (second particle size distribution data) acquired in Step S105, bubble size distribution of fine bubbles contained in the target liquid L is measured (Step S106: bubble size distribution measuring step). That is, the control unit 51 performs processing of subtracting a value of each of the elements $q_j$ of the second particle size distribution data from a value of each of the elements $q_j$ of the first particle size distribution data, so that bubble size distribution data as shown in (c) of FIG. 5 can be obtained.

5. Application Example of Fine Bubble Elimination Device (1) As an application example of the fine bubble elimination device 100, there is an application in which the surface tension of the target liquid L is optionally adjusted. If fine bubbles are contained in the target liquid L, the surface tension of the target liquid L can be reduced, so that processing utilizing its characteristics can be performed. In this case, if the fine bubble elimination device 100 is used, the target liquid L having a reduced surface tension due to the inclusion of the fine bubbles is irradiated with ultrasonic waves, and the fine bubbles in the target liquid L are reduced, so that the surface tension of the target liquid L can be increased.

Therefore, after the target liquid L with a low surface tension that contains fine bubbles is used to perform processing using its characteristics, the fine bubbles in the target liquid L are reduced only by irradiating the target liquid L with ultrasonic waves, and the surface tension of the target liquid L can be restored to that of original liquid.

In this case, a reduction amount of the fine bubbles in the target liquid L may be adjusted by adjusting at least one of a frequency, irradiation time, and irradiation intensity of the ultrasonic waves emitted from the ultrasonic irradiation device 102. This allows the reduction amount of fine bubbles in the target liquid L to be optionally adjusted. As described above, the target liquid L can be set to have a desired surface tension by optionally adjusting a reduction amount of fine bubbles.

(2) Another application example of the fine bubble elimination device 100 is an application in which fine bubbles generated when restoring a target object such as lyophilized protein are reduced. That is, the target liquid L containing fine bubbles may be obtained by restoring the lyophilized target object (target liquid acquiring step), and the target liquid L may be irradiated with ultrasonic waves.

In this case, fine bubbles in the target liquid L obtained by restoring the lyophilized target object can be reduced using ultrasonic waves. In a case where lyophilized protein is restored as described above, fine bubbles generated at that time may cause aggregation. However, by reducing the fine bubbles using ultrasonic waves, aggregation can be prevented.

6. Variation

The configuration is not limited to the one in which bubble size distribution is measured based on particle size distribution data of the target liquid L before and after ultrasonic irradiation as in the above embodiment, and may be one in which bubble size distribution is measured based on other pieces of data relating to particle size distribution. That is, the configuration is not only that bubble size distribution of fine bubbles can be measured based on particle size distribution data finally calculated, but also that bubble size distribution of fine bubbles can be measured based on data used to calculate particle size distribution data such as light intensity distribution data. Note that data for calculating particle size distribution data is not limited to light intensity distribution data, and may be other pieces of data calculated from light intensity distribution data.

In the above embodiment, the case where the bubble size distribution measuring device is a scattering type particle size analyzer. However, the present invention is also applicable to a configuration in which particle size distribution is measured by a method other than the laser diffraction method. As methods other than the laser diffraction method, for example, a dynamic light scattering method, an electrical sensing zone method, a particle trajectory analysis method, a resonance mass measurement method, and a dynamic image analysis method can be exemplified. In any of these methods, a value specific to gas constituting gas particles can be used as a parameter such as a refractive index. Further, the bubble size distribution measuring device according to the present invention can be applied to a light scattering type or light shielding type particle counter and the like.

The invention claimed is:

1. A fine bubble elimination method comprising
   a target liquid acquiring step of acquiring a target liquid containing ultrafine bubbles by restoring a lyophilized target object;

a container installing step of installing a container containing the target liquid at an installation position; and an ultrasonic irradiation step of irradiating the target liquid containing the ultrafine bubbles having a bubble diameter of less than 1 μm with an ultrasonic wave from an ultrasonic irradiation device to reduce the ultrafine bubbles in the target liquid, wherein the ultrasonic irradiation step irradiates the target liquid installed at the installation position with an ultrasonic wave having a frequency of 430 kHz or more, and a lower part of the container installed at the installation position is always fixed at an antinode in a standing wave of the ultrasonic wave emitted from the ultrasonic irradiation device.

2. The fine bubble elimination method according to claim 1, wherein a gap is formed above the target liquid in the container.

3. The fine bubble elimination method according to claim 1 further comprising a standing step of allowing the target liquid to stand for a certain period of time after the ultrasonic irradiation step irradiates the target liquid with the ultrasonic wave.

4. The fine bubble elimination method according to claim 1, wherein an additive having high solubility is added to the target liquid.

5. The fine bubble elimination method according to claim 1, wherein the ultrasonic irradiation step irradiates the target liquid having a reduced surface tension due to inclusion of the ultrafine bubbles with the ultrasonic wave to reduce the ultrafine bubbles in the target liquid, so that a surface tension of the target liquid is increased.

6. The fine bubble elimination method according to claim 1, wherein the ultrasonic irradiation step adjusts a reduction amount of the ultrafine bubbles in the target liquid by adjusting at least one of a frequency, an irradiation time, and an irradiation intensity of the ultrasonic wave emitted from the ultrasonic irradiation device.

7. A bubble size distribution measuring method comprising a step of measuring bubble size distribution of ultrafine bubbles contained in a target liquid based on data on particle size distribution of the target liquid having the ultrafine bubbles reduced by the fine bubble elimination method according to claim 1, and the data on the particle size distribution of the target liquid before the ultrafine bubbles are reduced.

8. A bubble size distribution measuring device configured to measure bubble size distribution of ultrafine bubbles contained in a target liquid based on data on particle size distribution of the target liquid having the ultrafine bubbles reduced by the fine bubble elimination method according to claim 1, and the data on the particle size distribution of the target liquid before the ultrafine bubbles are reduced.

* * * * *